(12) United States Patent
Ballesteros et al.

(10) Patent No.: US 10,075,215 B2
(45) Date of Patent: Sep. 11, 2018

(54) RADIO COMMUNICATION DEVICES AND METHODS FOR CONTROLLING A RADIO COMMUNICATION DEVICE

(71) Applicant: Intel Corporation, Santa Clara, CA (US)

(72) Inventors: Miguel Ballesteros, Roseville, CA (US); Nagaraj Raviprakash, Tigard, OR (US); Kenneth W. Reese, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/068,713

(22) Filed: Mar. 14, 2016

(65) Prior Publication Data

US 2016/0269080 A1 Sep. 15, 2016

Related U.S. Application Data

(63) Continuation of application No. 14/141,541, filed on Dec. 27, 2013, now Pat. No. 9,319,088.

(Continued)

(51) Int. Cl.
*H04B 5/00* (2006.01)
*H04B 5/02* (2006.01)
(Continued)

(52) U.S. Cl.
CPC .............. *H04B 5/02* (2013.01); *G06F 21/86* (2013.01); *H04B 1/40* (2013.01); *H04L 63/0492* (2013.01);
(Continued)

(58) Field of Classification Search
CPC .. H04B 5/02; H04B 1/40; G06F 21/86; H04L 63/0492; H04L 63/0853; H04W 4/008; H04W 48/18; H04M 2250/04
(Continued)

(56) References Cited

U.S. PATENT DOCUMENTS 7,762,470 B2 * 7/2010 Finn ..................... G06K 7/0004
235/380
8,118,218 B2 * 2/2012 Koh ....................... G06Q 20/06
235/380
(Continued)

FOREIGN PATENT DOCUMENTS

CN 101536008 A 9/2009
CN 102695166 A 9/2012
(Continued)

OTHER PUBLICATIONS

Office Action received for corresponding German Patent Application No. 10 2014 104 303.0 dated Oct. 26, 2016, 6 pages (Information Purpose Only).
(Continued)

*Primary Examiner* — Marceau Milord
(74) *Attorney, Agent, or Firm* — Viering Jentschura & Partner MBB (57) ABSTRACT

A radio communication device is described comprising: a transceiver circuit configured to communicate wirelessly with another device; a tamper-proof circuit connected to the transceiver circuit; and a processor connected to the tamper-proof circuit and configured to exchange data with the transceiver circuit via the tamper-proof circuit.

15 Claims, 2 Drawing Sheets

Related U.S. Application Data (60) Provisional application No. 61/821,428, filed on May 9, 2013.

(51) Int. Cl.

| | |
|---|---|
| *H04B 1/40* | (2015.01) |
| *H04W 4/80* | (2018.01) |
| *H04W 4/00* | (2018.01) |
| *G06F 21/86* | (2013.01) |
| *H04L 29/06* | (2006.01) |
| *H04W 48/18* | (2009.01) |

(52) U.S. Cl.
CPC ............ *H04W 4/008* (2013.01); *H04W 4/80* (2018.02); *H04W 48/18* (2013.01); *H04L 63/0853* (2013.01); *H04M 2250/04* (2013.01)

(58) Field of Classification Search
USPC .............................. 455/41.1, 73, 41.2, 550.1
See application file for complete search history.

(56) References Cited

U.S. PATENT DOCUMENTS

| | | | | |
|---|---|---|---|---|
| 8,370,629 | B1* | 2/2013 | Ngo | H04W 4/021 |
| | | | | 713/168 |
| 8,666,368 | B2* | 3/2014 | Schell | H04L 63/062 |
| | | | | 370/328 |
| 8,681,741 | B1* | 3/2014 | Ngo | H04W 4/023 |
| | | | | 370/331 |
| 8,700,729 | B2* | 4/2014 | Dua | G06Q 20/20 |
| | | | | 705/64 |
| 8,831,677 | B2* | 9/2014 | Villa-Real | H04M 1/66 |
| | | | | 455/552.1 |
| 8,984,592 | B1* | 3/2015 | Paczkowski | H04W 12/08 |
| | | | | 726/26 |
| 8,996,002 | B2* | 3/2015 | Rodgers | H04W 8/183 |
| | | | | 370/310 |
| 9,100,393 | B2* | 8/2015 | Schell | G06F 21/34 |
| 9,319,088 | B2* | 4/2016 | Ballesteros | H04B 1/40 |
| 9,419,970 | B2* | 8/2016 | Haggerty | H04L 63/0272 |
| 2006/0198364 | A1 | 9/2006 | Fujii | |
| 2008/0285755 | A1 | 11/2008 | Camus et al. | |
| 2009/0275364 | A1* | 11/2009 | Morel | G06K 7/10297 |
| | | | | 455/558 |
| 2012/0190332 | A1 | 7/2012 | Charles | |
| 2012/0238207 | A1* | 9/2012 | Marcovecchio | H04L 63/0492 |
| | | | | 455/41.1 |
| 2012/0297204 | A1 | 11/2012 | Buer | |
| 2013/0063255 | A1 | 3/2013 | Washiro | |
| 2013/0139230 | A1* | 5/2013 | Koh | G06F 21/44 |
| | | | | 726/5 |
| 2014/0085089 | A1* | 3/2014 | Rasband | G08B 13/246 |
| | | | | 340/572.1 |
| 2014/0091932 | A1* | 4/2014 | Mohiuddin | G08B 13/246 |
| | | | | 340/572.1 |
| 2014/0337227 | A1* | 11/2014 | Dua | G06Q 20/20 |
| | | | | 705/44 |

FOREIGN PATENT DOCUMENTS

| | | |
|---|---|---|
| CN | 102722813 A | 10/2012 |
| CN | 102859966 A | 1/2013 |
| CN | 102983886 A | 3/2013 |
| JP | 2002524808 A | 8/2002 |
| JP | 2006246343 A | 9/2006 |
| JP | 2007150970 A | 6/2007 |
| JP | 2008538668 A | 10/2008 |
| JP | 2011090686 A | 5/2011 |
| JP | 2013058926 A | 3/2013 |
| WO | 0014984 A1 | 3/2000 |
| WO | 2004025545 A2 | 3/2004 |
| WO | 2008034937 A1 | 3/2008 |
| WO | 2011139795 A1 | 11/2011 |
| WO | 2012067640 A1 | 5/2012 |

OTHER PUBLICATIONS

GSM Association, "Mobile NFC Infrastructure", Version 1.0, Jul. 2012, 10 pages.

Chinese Office Action based on Application No. 201410194258.X dated Mar. 31, 2017 10 pages and 21 pages of English translation (For reference purpose only).

Japanese Office Action based on Application No. 2016073848 dated May 30, 2017, 3 pages of Office Action and 2 pages of English translation (for reference purpose only).

Japanese Office Action based on application No. 2016-073848, dated Feb. 6, 2018, 3 pages and 5 pages of English translation (Reference Purpose Only).

Japanese Office Action based on Application No. 2016-073848, dated May 30, 2017, 3 pages of Office Action and 2 pages of English translation (Reference Purpose Only).

Chinese Office Action based on application No. 201610400589.3, dated Jun. 27, 2018, 18 pages (Reference Purpose Only).

* cited by examiner

RADIO COMMUNICATION DEVICES AND METHODS FOR CONTROLLING A RADIO COMMUNICATION DEVICE

CROSS-REFERENCE TO RELATED APPLICATION

This application is a continuation of U.S. Ser. No. 14/141,541 filed on Dec. 27, 2013 which claims the benefit of the U.S. provisional patent application 61/821,428 filed on May 9, 2013, all of which are hereby incorporated by reference in their entirety for all purposes.

TECHNICAL FIELD

The present disclosure generally relates to radio communication devices and methods for controlling a radio communication device.

BACKGROUND

NFC (Near Field Communication) is gaining wide acceptance within mobile devices and as a result, NFC radios are being included in more and more consumer devices, such as but not limited to smartphones, tablets, and ultrabooks. Thus, there may be a need for a tamper-resistant NFC reader.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" (which may also be referred to as a component) may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

NFC (Near Field Communication) is gaining wide acceptance within mobile devices and as a result, NFC radios are being included in more and more consumer devices, such as but not limited to smartphones, tablets, and Ultrabooks. NFC technology is very flexible and has the capability of being used for countless purposes. Many of the use cases are for convenience (just tap to have something useful or interesting happen) and do not require a high level of security. However, many usage cases do require a high level of security, especially when there is value associated with the information that is made available over the NFC interface. For example: contactless credit cards, contactless identity cards, contactless access control cards (physical and logical) may contain information that can be fraudulently exploited by a malicious $3^{rd}$ party. One way to solve this problem, which has been the commonly used approach, is to have specialized highly secure NFC terminal equipment that guarantees that the information is safely processed (and never leaked) when accessed from an NFC tag, contactless card, or NFC device (e.g. smartphone). However, that approach is expensive because the terminals are specialized and dedicated devices. As consumer devices are expanding their capabilities year over year, there is now a potential to leverage the native NFC capabilities of NFC devices to replace the specialized terminals but the problem is that consumer devices are not designed to be highly secure as specialized terminals.

Some of the commonly used devices do not provide any protection for sensitive data as the data is directly sent to the Application Processor where malicious SW (software) may intercept it. Better solutions make use of a Trusted Execution Environment (TEE) within the Application Processor to protect the sensitive data as it enters the Application Processor environment, but TEEs are not tamper-proof. Finally, some other solutions rely on the NFC controller itself and run a modified NFC controller firmware version to manage the sensitive data, but again NFC controllers are not tamper proof.

Figure 1:
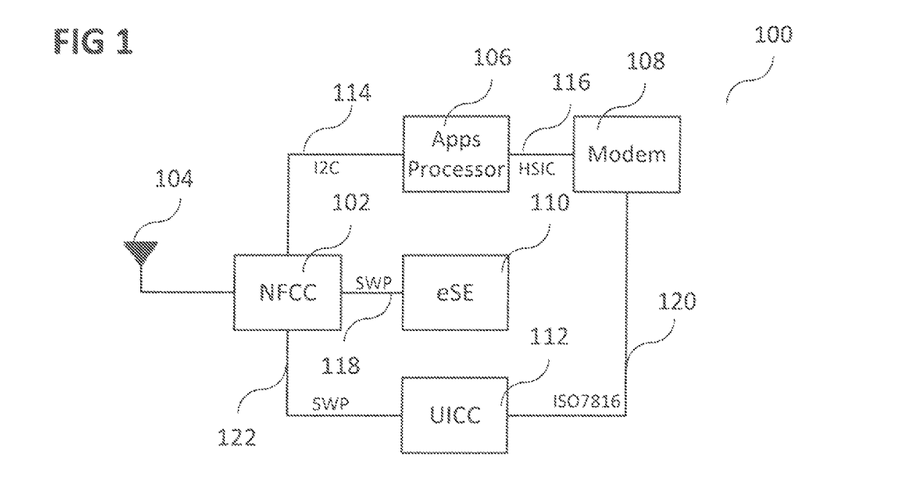
FIG. 1 shows an exemplary NFC (near field communication) architecture.

FIG. 1 shows an exemplary NFC architecture 100. In the case of the exemplary architecture, it is clear that it is NFC Controller (NFCC) 102 centric. The NFC Controller 102 is the center of a star topology where both the Apps (application) Processor 106 (via an I2C connection 114) and the Secure Element (SE; for example in the form of an eSE (embedded Secure Element) 110 and/or UICC (Universal Integrated Circuit Card) 112) are connected directly to the NFCC 102 (for example via a SWP (single wire protocol) connection 118 or 122). This is the reason the sensitive data needs to be protected in some way from the potentially malicious SW running on the Application Processor (AP) 106 either at the NFCC 102 as the data is received over the contactless interface (for example using an antenna 104) or at the AP 106 through a Trusted Execution Environment (TEE). As described herein, the disadvantage of these approaches is that they do not provide tamper-proof protection and therefore those solutions do not meet the security requirements for highly sensitive data processing use cases.

Furthermore, as shown in FIG. 1, the AP 106 may be connected to a modem 108, for example via a HSIC (High Speed Inter Chip) connection 116. The modem 108 may be connected to the UICC via a ISO 7816 connection 120.

According to various aspects of this disclosure, a solution to the aforementioned problem may be provided by creating a tamper-proof subsystem within a device (e.g. smartphone, tablet, Ultrabook, etc.) with NFC capabilities. A typical NFC subsystem may already have the components required to create such environment but the way they currently interact needs to change.

Figure 2:
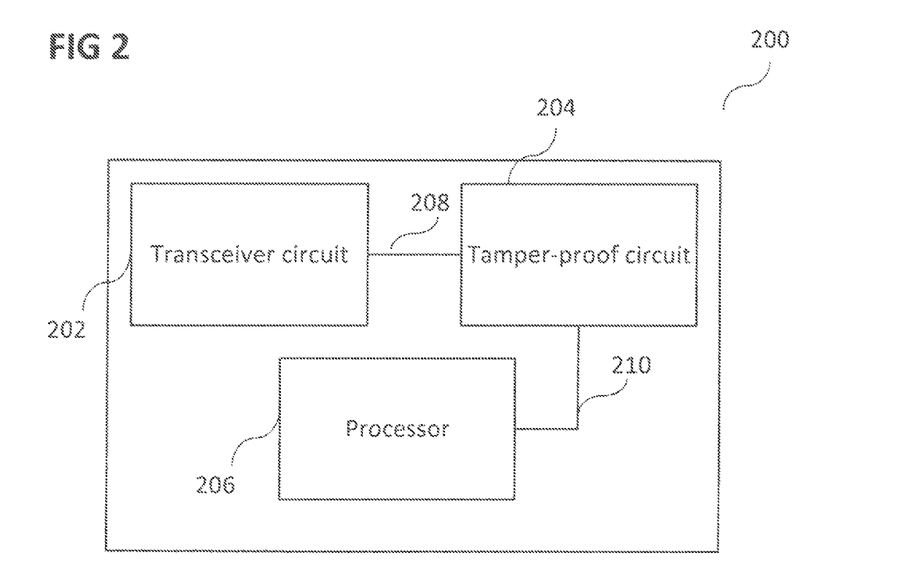
FIG. 2 shows a radio communication device according to various aspects of this disclosure.

FIG. 2 shows a radio communication device 200 according to various aspects of this disclosure. The radio communication device 200 may include a transceiver circuit 202 configured to communicate wirelessly with another device (not shown). The radio communication device 200 may include a tamper-proof circuit 204 connected to the transceiver circuit 202. The radio communication device 200 may further include a processor 206, for example, a central processing unit, connected to the tamper-proof circuit 204 and configured to exchange data with the transceiver circuit 202 via the tamper-proof circuit 204. The transceiver circuit 202 and the tamper-proof circuit 204 may be coupled with each other, for example via a connection 208, for example an optical connection or an electrical connection, such as for example a cable or a computer bus or via any other suitable electrical connection to exchange electrical signals. The tamper-proof circuit 204 and the processor 206 may be coupled with each other, for example via a connection 210, for example an optical connection or an electrical connection, such as for example a cable or a computer bus or via any other suitable electrical connection to exchange electrical signals.

In other words, the processor 206 may be configured to exchange the data (for example secure data; for example all data) with the transceiver circuit 202 exclusively via the tamper-proof circuit 204. In other words, all communication between the transceiver circuit 202 and the processor 206 is routed via the tamper-proof circuit 204. In other words, there may be no way of the transceiver circuit 202 and the processor 206 communicating directly, but all communication is done via the tamper-proof circuit 204. In other words, there is no (direct) physical data connection between the transceiver circuit 202 and the processor 206.

The processor 206 may exchange data with the transceiver circuit 202 free from a direct physical signaling between the processor 206 and the transceiver circuit 202.

The radio communication device 200 may further include a first interface (for example for the connection 208) between the transceiver circuit 202 and the tamper-proof circuit 204.

The first interface may include or may be a single wire protocol interface.

The radio communication device 200 may further include a second interface (for example for the connection 210) between the tamper-proof circuit 204 and the processor 206.

The second interface may include or may be a serial peripheral interface.

The radio communication device may be free from an interface between the transceiver circuit 202 and the processor 206.

The tamper-proof circuit 204 may securely process data.

The tamper-proof circuit 204 may include or may be a secure element.

The radio communication device 200 may further include a secure element including (or being) the tamper-proof circuit 204.

The tamper-proof circuit 204 may include or may be an embedded secure element.

The radio communication device 200 may further include an embedded secure element including (or being) the tamper-proof circuit 204.

The tamper-proof circuit 204 may include or may be a subscriber identity module.

The radio communication device 200 may further include a subscriber identity module including (or being) the tamper-proof circuit 204.

The tamper-proof circuit 204 may include or may be a universal integrated circuit card.

The radio communication device 200 may further include a universal integrated circuit card including (or being) the tamper-proof circuit 204.

The transceiver circuit 202 may include or may be a near field communication controller.

The radio communication device 200 may further include a near field communication controller including (or being) the transceiver circuit 202.

The processor 204 may include or may be an application processor.

The radio communication device 200 may further include an application processor including (or being) the processor 204.

The radio communication device 200 may be (or may be included in) a contactless card.

The radio communication device 200 may be (or may be included in) a contactless credit card.

The radio communication device 200 may be (or may be included in) an NFC tag.

The radio communication device 200 may be (or may be included in) an NFC device.

The radio communication device 200 may be (or may be included in) in a mobile point of sale terminal.

The radio communication device 200 may be (or may be included in) in a payment processing device.

The radio communication device 200 may be (or may be included in) a NFC reader.

Figure 3:
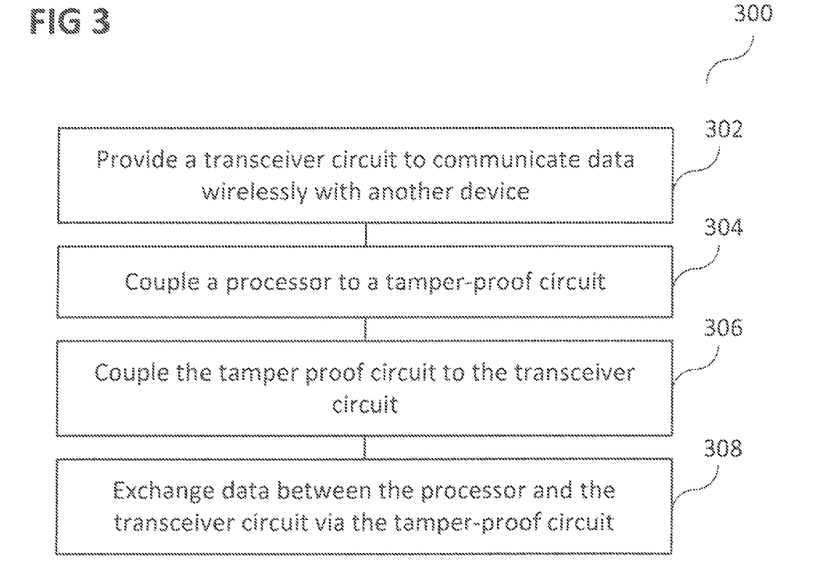
FIG. 3 shows a flow diagram illustrating a method for controlling a radio communication device according to various aspects of this disclosure.

FIG. 3 shows a flow diagram 300 illustrating a method for controlling a radio communication device according to various aspects of this disclosure. The method may include, like illustrated in 302, providing a transceiver circuit to communicate data wirelessly with another device. The method may include, like illustrated in 304, coupling a processor (for example a central processing unit) to a tamper-proof circuit, and, like illustrated in 306, coupling the tamper-proof circuit to the transceiver circuit. In 308, the radio communication device may exchange data between the processor and the transceiver circuit via the tamper-proof circuit.

The processor may exchange data with the transceiver circuit free from a direct physical signaling between the processor and the transceiver circuit.

The radio communication device may include a first interface between the transceiver circuit and the tamper-proof circuit.

The first interface may include or may be a single wire protocol interface.

The radio communication device may include a second interface between the tamper-proof circuit and the processor.

The second interface may include or may be a serial peripheral interface.

The radio communication device may be free from an interface between the transceiver circuit and the processor.

The tamper-proof circuit may securely process data.

The tamper-proof circuit may include or may be a secure element.

The radio communication device may include a secure element including (or being) the tamper-proof circuit.

The tamper-proof circuit may include or may be an embedded secure element.

The radio communication device may include an embedded secure element including (or being) the tamper-proof circuit.

The tamper-proof circuit may include or may be a subscriber identity module.

The radio communication device may include a subscriber identity module including (or being) the tamper-proof circuit.

The tamper-proof circuit may include or may be a universal integrated circuit card.

The radio communication device may include a universal integrated circuit card including (or being) the tamper-proof circuit.

The transceiver circuit may include or may be a near field communication controller.

The radio communication device may include a near field communication including (or being) the transceiver circuit.

The processor may include or may be an application processor.

The radio communication device may include an application processor including (or being) the processor.

The radio communication device may be (or may be included in) a contactless card.

The radio communication device may be (or may be included in) a contactless credit card.

The radio communication device may be (or may be included in) an NFC tag.

The radio communication device may be (or may be included in) an NFC device.

The radio communication device may be (or may be included in) a mobile point of sale terminal.

The radio communication device may be (or may be included in) a payment processing device.

The radio communication device may be (or may be included in) a NFC reader.

The radio communication device according to various aspects of this disclosure may for example be (or may for example be included in) a tamper-resistant NFC reader.

Figure 4:
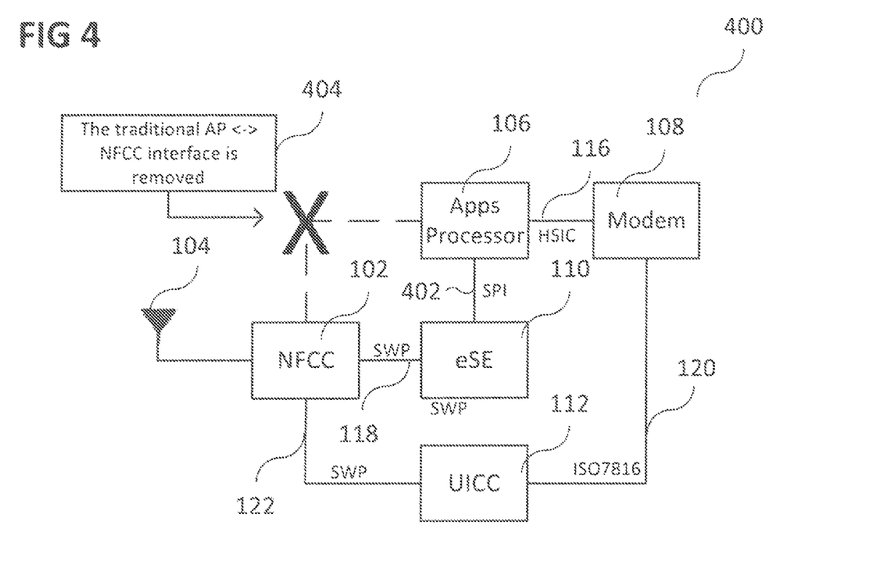
FIG. 4 shows a tamper-proof NFC architecture according to various aspects of this disclosure.

FIG. 4 shows a tamper-proof NFC architecture 400 according to various aspects of this disclosure. Various portions of the architecture 400 shown in FIG. 4 may be similar or identical to portions of the architecture 100 shown in FIG. 1, so that the same reference signs may be used and duplicate description may be omitted.

The devices according to various aspects of this disclosure may be based on a tamper-proof component (e.g. Secure Element) 110 being at the center of the architecture. In this tamper-proof centric architecture, the NFC controller 102 is physically (as opposed to virtually) isolated from the Application Processor 106 (or main CPU) by removing the data path between the NFC controller 102 and the Application Processor 106 (like indicated by cross 404). Instead, the Application Processor 106 is connected to the tamper-proof component 110 (for example via a SPI (serial peripheral interface) connection 402) and the tamper-proof component, for example the embedded Secure Element (eSE) 110, in turn is connected to the NFC controller 118. In this way, the highly sensitive data received over the NFC interface is sent directly and exclusively to the tamper-proof component, for example the eSE 110, where it can be securely processed without ever exposing such sensitive data directly to the Application Processor 106 and the SW (software) running on it (which may be compromised and/or malicious).

The devices and methods according to various aspects of this disclosure provide a solution which is better than the commonly used solutions because of their tamper-proof protection.

The devices and methods according to various aspects of this disclosure provide a way of how the NFC subsystem components are interconnected to create an NFC tamper-proof environment.

In the architecture according to various aspects of this disclosure, the tamper-proof component is the SE (e.g. either eSE or UICC) and is inserted between the AP and the NFCC so that any highly sensitive data received over the contactless interface is passed directly and exclusively to the SE for secure processing. The host SW (e.g. Android, Windows, etc.) is unable to access any of the sensitive data outside of the SE because there is no direct physical connection between the AP and the NFCC. A centralized tamper-proof protection may be what makes this architecture robust because both SW and HW (hardware) attacks are mitigated by SW and HW countermeasures that may be formally evaluated and certified by EMVco and/or Common Criteria standard procedures and suitable for highly secure use cases within the payment industry (i.e. make and receive payment), Mobile Subscription Management, Identity Management, strong Authentication, etc.

It is to be noted that although at present Secure Elements are the tamper-proof architecture building blocks, this idea is agnostic to the implementation of the tamper-proof component. For example, tamper-proof protection may be integrated into SOC (system on a chip) chip technology thereby displacing the discrete SE of today in favor of an integrated solution.

The SOC may have a direct connection to the Secure Element while the interface between the application processor (main CPU) and the NFC Controller may be removed as depicted in the architecture in FIG. 4. Code may be provided (for example as applets to run on the secure element and also middleware and application code running on the application processor) to exercise the secure NFC reader mode.

In an aspect of this disclosure, methods and devices may be provided to isolate the NFC interface within a tamper-proof subsystem to read and process highly sensitive data from an external NFC entity (e.g. contactless (credit) card, NFC tag, NFC device, mobile point of sale (mPOS), payment processing device, secure NFC reader), which may provide a tamper-proof environment.

NFC controllers and SecureElements chips may be provided in the form of embedded SecureElements, UICC or SIM (subscriber identity module) cards, or SD cards.

In an aspect of this disclosure, an apparatus for communicating wirelessly may include: a near field communication (NFC) module; a secure element (SE) module connected to the NFC module for receiving first data from the NFC module; an application processor (AP) module connected to the SE module for receiving second data from the SE module; wherein the AP module does not have a capability for accessing the first data in the NFC module.

In an aspect of this disclosure, a method may include: wirelessly receiving first data into a near field communication (NFC) module; transferring the first data into a secure element (SE) module; performing a secure function on the first data in the SE module to produce second data; and transferring the second data to an application processor (AP) module.

In an aspect of this disclosure, a computer-readable storage medium may contain instructions, which when executed by one or more processors result in performing the method as described above.

The following examples pertain to further embodiments.

Example 1 is a radio communication device comprising: a transceiver circuit configured to communicate wirelessly with another device; a tamper-proof circuit coupled to the transceiver circuit; and a processor coupled to the tamper-proof circuit and configured to exchange data with the transceiver circuit via the tamper-proof circuit.

In example 2, the subject-matter of example 1 can optionally include that the processor is configured to exchange data with the transceiver circuit free from a direct physical signaling between the processor and the transceiver circuit.

In example 3, the subject-matter of example 1 or 2 can optionally include that the processor is configured to exchange data with the transceiver circuit exclusively via the tamper-proof circuit In example 4, the subject-matter of any one of examples 1 to 3 can optionally include a first interface between the transceiver circuit and the tamper-proof circuit.

In example 5, the subject-matter of any one of examples 1 to 4 can optionally include that the first interface comprises a single wire protocol interface.

In example 6, the subject-matter of any one of examples 1 to 5 can optionally include a second interface between the tamper-proof circuit and the processor.

In example 7, the subject-matter of example 6 can optionally include that the second interface comprises a serial peripheral interface.

In example 8, the subject-matter of any one of examples 1 to 7 can optionally include that the radio communication device is free from an interface between the transceiver circuit and the processor.

In example 9, the subject-matter of any one of examples 1 to 8 can optionally include that the tamper-proof circuit is configured to securely process data.

In example 10, the subject-matter of any one of examples 1 to 9 can optionally include that the tamper-proof circuit comprises a secure element.

In example 11, the subject-matter of any one of examples 1 to 10 can optionally include a secure element comprising the tamper-proof circuit.

In example 12, the subject-matter of any one of examples 1 to 11 can optionally include that the tamper-proof circuit comprises an embedded secure element.

In example 13, the subject-matter of any one of examples 1 to 12 can optionally include an embedded secure element comprising the tamper-proof circuit.

In example 14, the subject-matter of any one of examples 1 to 13 can optionally include that the tamper-proof circuit comprises a subscriber identity module.

In example 15, the subject-matter of any one of examples 1 to 14 can optionally include a subscriber identity module comprising the tamper-proof circuit.

In example 16, the subject-matter of any one of examples 1 to 15 can optionally include that the tamper-proof circuit comprises a universal integrated circuit card.

In example 17, the subject-matter of any one of examples 1 to 16 can optionally include a universal integrated circuit card comprising the tamper-proof circuit.

In example 18, the subject-matter of any one of examples 1 to 17 can optionally include that the transceiver circuit comprises a near field communication controller.

In example 19, the subject-matter of any one of examples 1 to 18 can optionally include a near field communication controller comprising the transceiver circuit.

In example 20, the subject-matter of any one of examples 1 to 19 can optionally include that the processor comprises a central processing unit.

In example 21, the subject-matter of any one of examples 1 to 20 can optionally include a central processing unit comprising the processor.

In example 22, the subject-matter of any one of examples 1 to 21 can optionally include that the processor comprises an application processor.

In example 23, the subject-matter of any one of examples 1 to 22 can optionally include an application processor comprising the processor.

In example 24, the subject-matter of any one of examples 1 to 23 can optionally include that the radio communication device is a contactless card.

In example 25, the subject-matter of any one of examples 1 to 24 can optionally include that the radio communication device is a contactless credit card.

In example 26, the subject-matter of any one of examples 1 to 25 can optionally include that the radio communication device is an NFC tag.

In example 27, the subject-matter of any one of examples 1 to 26 can optionally include that the radio communication device is an NFC device.

In example 28, the subject-matter of any one of examples 1 to 27 can optionally include that the radio communication device is a mobile point of sale terminal.

In example 29, the subject-matter of any one of examples 1 to 28 can optionally include that the radio communication device is a payment processing device.

In example 30, the subject-matter of any one of examples 1 to 29 can optionally include that the radio communication device is a NFC reader.

Example 31 is a method for controlling a radio communication device, the method comprising: providing a transceiver circuit to communicate data wirelessly with another device; coupling a processor to a tamper-proof component;

coupling the tamper-proof component to the transceiver circuit; and exchanging data between the processor and the transceiver circuit via the tamper-proof circuit.

In example 32, the subject-matter of example 31 can optionally include that the processor exchanges data with the transceiver circuit free from a direct physical signaling between the processor and the transceiver circuit.

In example 33, the subject-matter of example 31 or 32 can optionally include that the processor exchanges data with the transceiver circuit exclusively via the tamper-proof circuit.

In example 34, the subject-matter of any one of examples 31 to 33 can optionally include that the radio communication device comprises a first interface between the transceiver circuit and the tamper-proof circuit.

In example 35, the subject-matter of example 34 can optionally include that the first interface comprises a single wire protocol interface.

In example 36, the subject-matter of any one of examples 31 to 35 can optionally include that the radio communication device comprises a second interface between the tamper-proof circuit and the processor.

In example 37, the subject-matter of example 36 can optionally include that the second interface comprises a serial peripheral interface.

In example 38, the subject-matter of any one of examples 31 to 37 can optionally include that the radio communication device is free from an interface between the transceiver circuit and the processor.

In example 39, the subject-matter of any one of examples 31 to 38 can optionally include that the tamper-proof circuit securely processes data.

In example 40, the subject-matter of any one of examples 31 to 39 can optionally include that the tamper-proof circuit comprises a secure element.

In example 41, the subject-matter of any one of examples 31 to 40 can optionally include that the radio communication device comprises a secure element comprising the tamper-proof circuit.

In example 42, the subject-matter of any one of examples 31 to 41 can optionally include that the tamper-proof circuit comprises an embedded secure element.

In example 43, the subject-matter of any one of examples 31 to 42 can optionally include that the radio communication device comprises an embedded secure element comprising the tamper-proof circuit.

In example 44, the subject-matter of any one of examples 31 to 43 can optionally include that the tamper-proof circuit comprises a subscriber identity module.

In example 45, the subject-matter of any one of examples 31 to 44 can optionally include that the radio communication device comprises a subscriber identity module comprising the tamper-proof circuit.

In example 46, the subject-matter of any one of examples 31 to 45 can optionally include that the tamper-proof circuit comprises a universal integrated circuit card.

In example 47, the subject-matter of any one of examples 31 to 46 can optionally include that the radio communication device comprises a universal integrated circuit card comprising the tamper-proof circuit.

In example 48, the subject-matter of any one of examples 31 to 47 can optionally include that the transceiver circuit comprises a near field communication controller.

In example 49, the subject-matter of any one of examples 31 to 48 can optionally include that the radio communication device comprises a near field communication controller comprising the transceiver circuit.

In example 50, the subject-matter of any one of examples 31 to 49 can optionally include that the processor comprises a central processing unit.

In example 51, the subject-matter of any one of examples 31 to 50 can optionally include that the radio communication device comprises a central processing unit comprising the processor.

In example 52, the subject-matter of any one of examples 31 to 51 can optionally include that the processor comprises an application processor.

In example 53, the subject-matter of any one of examples 31 to 52 can optionally include that the radio communication device comprises an application processor comprising the processor.

In example 54, the subject-matter of any one of examples 31 to 53 can optionally include that the radio communication device is a contactless card.

In example 55, the subject-matter of any one of examples 31 to 54 can optionally include that the radio communication device is a contactless credit card.

In example 56, the subject-matter of any one of examples 31 to 55 can optionally include that the radio communication device is an NFC tag.

In example 57, the subject-matter of any one of examples 31 to 56 can optionally include that the radio communication device is an NFC device.

In example 58, the subject-matter of any one of examples 31 to 57 can optionally include that the radio communication device is a mobile point of sale terminal.

In example 59, the subject-matter of any one of examples 31 to 58 can optionally include that the radio communication device is a payment processing device.

In example 60, the subject-matter of any one of examples 31 to 59 can optionally include that the radio communication device is a NFC reader.

Example 61 is a radio communication device comprising: a transceiver means for communicating wirelessly with another device; a tamper-proof means coupled to the transceiver means; and a processing means coupled to the tamper-proof means and for exchanging data with the transceiver means via the tamper-proof means.

In example 62, the subject-matter of example 61 can optionally include that the processing means is for exchanging data with the transceiver means free from a direct physical signaling between the processing means and the transceiver means.

In example 63, the subject-matter of any one of examples 61 or 62 can optionally include that the processing means is for exchanging data with the transceiver means exclusively via the tamper-proof means.

In example 64, the subject-matter of any one of examples 61 to 63 can optionally include a first interface means between the transceiver means and the tamper-proof means.

In example 65, the subject-matter of example 64 can optionally include that the first interface means comprises a single wire protocol interface.

In example 66, the subject-matter of any one of examples 61 to 65 can optionally include a second interface means between the tamper-proof means and the processing means.

In example 67, the subject-matter of example 66 can optionally include that the second interface means comprises a serial peripheral interface.

In example 68, the subject-matter of any one of examples 61 to 67 can optionally include that the radio communication device is free from an interface means between the transceiver means and the processing means.

In example 69, the subject-matter of any one of examples 61 to 68 can optionally include that the tamper-proof means is for securely processing data.

In example 70, the subject-matter of any one of examples 61 to 69 can optionally include that the tamper-proof means comprises a secure element.

In example 71, the subject-matter of any one of examples 61 to 70 can optionally include a secure element comprising the tamper-proof means.

In example 72, the subject-matter of any one of examples 61 to 71 can optionally include that the tamper-proof means comprises an embedded secure element.

In example 73, the subject-matter of any one of examples 61 to 72 can optionally include an embedded secure element comprising the tamper-proof means.

In example 74, the subject-matter of any one of examples 61 to 73 can optionally include that the tamper-proof means comprises a subscriber identity module.

In example 75, the subject-matter of any one of examples 61 to 74 can optionally include a subscriber identity module comprising the tamper-proof means.

In example 76, the subject-matter of any one of examples 61 to 75 can optionally include that the tamper-proof means comprises a universal integrated circuit card.

In example 77, the subject-matter of any one of examples 61 to 76 can optionally include a universal integrated circuit card comprising the tamper-proof means.

In example 78, the subject-matter of any one of examples 61 to 77 can optionally include that the transceiver means comprises a near field communication controller.

In example 79, the subject-matter of any one of examples 61 to 78 can optionally include a near field communication controller comprising the transceiver means.

In example 80, the subject-matter of any one of examples 61 to 79 can optionally include that the processing means comprises a central processing unit.

In example 81, the subject-matter of any one of examples 61 to 80 can optionally include a central processing unit comprising the processing means.

In example 82, the subject-matter of any one of examples 61 to 81 can optionally include that the processing means comprises an application processor.

In example 83, the subject-matter of any one of examples 61 to 82 can optionally include an application processor comprising the processing means.

In example 84, the subject-matter of any one of examples 61 to 85 can optionally include that the radio communication device is a contactless card.

In example 85, the subject-matter of any one of examples 61 to 84 can optionally include that the radio communication device is a contactless credit card.

In example 86, the subject-matter of any one of examples 61 to 85 can optionally include that the radio communication device is an NFC tag.

In example 87, the subject-matter of any one of examples 61 to 86 can optionally include that the radio communication device is an NFC device.

In example 88, the subject-matter of any one of examples 61 to 87 can optionally include that the radio communication device is a mobile point of sale terminal.

In example 89, the subject-matter of any one of examples 61 to 88 can optionally include that the radio communication device is a payment processing device.

In example 90, the subject-matter of any one of examples 61 to 89 can optionally include that the radio communication device is a NFC reader.

Example 91 is a computer readable medium including program instructions which when executed by a processor cause the processor to perform a method for controlling a radio communication device, the computer readable medium further including program instructions which when executed by a processor cause the processor to perform: providing a transceiver circuit to communicate data wirelessly with another device; coupling the processor to a tamper-proof circuit; coupling the tamper-proof circuit to the transceiver circuit; and exchanging data between the processor and the transceiver circuit via the tamper-proof circuit.

In example 92, the subject-matter of example 91 can optionally include that the processor exchanges data with the transceiver circuit free from a direct physical signaling between the processor and the transceiver circuit.

In example 93, the subject-matter of example 91 or 92 can optionally include that the processor exchanges data with the transceiver circuit exclusively via the tamper-proof circuit.

In example 94, the subject-matter of any one of examples 91 to 93 can optionally include that the radio communication device comprises a first interface between the transceiver circuit and the tamper-proof circuit.

In example 95, the subject-matter of example 94 can optionally include that the first interface comprises a single wire protocol interface.

In example 96, the subject-matter of any one of examples 91 to 95 can optionally include that the radio communication device comprises a second interface between the tamper-proof circuit and the processor.

In example 97, the subject-matter of example 96 can optionally include that the second interface comprises a serial peripheral interface.

In example 98, the subject-matter of any one of examples 91 to 97 can optionally include that the radio communication device is free from an interface between the transceiver circuit and the processor.

In example 99, the subject-matter of any one of examples 91 to 98 can optionally include that the tamper-proof circuit securely processes data.

In example 100, the subject-matter of any one of examples 91 to 99 can optionally include that the tamper-proof circuit comprises a secure element.

In example 101, the subject-matter of any one of examples 91 to 100 can optionally include that the radio communication device comprises a secure element comprising the tamper-proof circuit.

In example 102, the subject-matter of any one of examples 91 to 101 can optionally include that the tamper-proof circuit comprises an embedded secure element.

In example 103, the subject-matter of any one of examples 91 to 102 can optionally include that the radio communication device comprises an embedded secure element comprising the tamper-proof circuit.

In example 104, the subject-matter of any one of examples 91 to 103 can optionally include that the tamper-proof circuit comprises a subscriber identity module.

In example 105, the subject-matter of any one of examples 91 to 104 can optionally include that the radio communication device comprises a subscriber identity module comprising the tamper-proof circuit.

In example 106, the subject-matter of any one of examples 91 to 105 can optionally include that the tamper-proof circuit comprises a universal integrated circuit card.

In example 107, the subject-matter of any one of examples 91 to 106 can optionally include that the radio communication device comprises a universal integrated circuit card comprising the tamper-proof circuit.

In example 108, the subject-matter of any one of examples 91 to 107 can optionally include that the transceiver circuit comprises a near field communication controller.

In example 109, the subject-matter of any one of examples 91 to 108 can optionally include that the radio communication device comprises a near field communication controller comprising the transceiver circuit.

In example 110, the subject-matter of any one of examples 91 to 109 can optionally include that the processor comprises a central processing unit.

In example 111, the subject-matter of any one of examples 91 to 110 can optionally include that the radio communication device comprises a central processing unit comprising the processor.

In example 112, the subject-matter of any one of examples 91 to 111 can optionally include that the processor comprises an application processor.

In example 113, the subject-matter of any one of examples 91 to 112 can optionally include that the radio communication device comprises an application processor comprising the processor.

In example 114, the subject-matter of any one of examples 91 to 113 can optionally include that the radio communication device is a contactless card.

In example 115, the subject-matter of any one of examples 91 to 114 can optionally include that the radio communication device is a contactless credit card.

In example 116, the subject-matter of any one of examples 91 to 115 can optionally include that the radio communication device is an NFC tag.

In example 117, the subject-matter of any one of examples 91 to 116 can optionally include that the radio communication device is an NFC device.

In example 118, the subject-matter of any one of examples 91 to 117 can optionally include that the radio communication device is a mobile point of sale terminal.

In example 119, the subject-matter of any one of examples 91 to 118 can optionally include that the radio communication device is a payment processing device.

In example 120, the subject-matter of any one of examples 91 to 119 can optionally include that the radio communication device is a NFC reader.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A device, comprising:
   an NFC controller, comprising:
      a transceiver circuit configured to wirelessly receive first data from a device;
      wherein the NFC controller is further configured to provide the first data, without having a direct physical signaling between the transceiver circuit and an application processor circuit, in the form of second data to the application processor circuit via a secure element, where a secure function is performed on the first data to produce the second data;
   the secure element operably coupled to the NFC controller via a first interface;
   the application processor circuit operably coupled to the secure element via a second interface; and
   an antenna coupled to the NFC controller.

2. The device of claim 1, wherein the NFC controller further comprises:
   one or more elements from a group of elements consisting of:
      an embedded secure element;
      a Universal Integrated Circuit Card; and
      a Subscriber Identity Module.

3. The device of claim 2, wherein the embedded secure element is an embedded Subscriber Identity Module.

4. The device of claim 1, wherein the NFC controller is integrated in a System-on-Chip or an Integrated Circuit.

5. The device of claim 1, wherein the NFC controller is configured to provide the first data to the secure element via a single wire protocol interface.

6. A device, comprising:
   an NFC controller, comprising:
      a transceiver circuit configured to wirelessly receive first data from a device; wherein the transceiver circuit is configured to communicate with an application processor circuit via a secure element without having a direct physical signaling between the transceiver circuit and the application processor circuit;
      wherein the NFC controller is further configured to provide the first data to the secure element to provide authentication;
   the secure element operably coupled to the NFC controller via a first interface;
   the application processor circuit operably coupled to the secure element via a second interface; and
   an antenna coupled to the NFC controller.

7. The device of claim 6, wherein the NFC controller further comprises:
   one or more elements from a group of elements consisting of:
      an embedded secure element;
      a Universal Integrated Circuit Card; and
      a Subscriber Identity Module.

8. The device of claim 7, wherein the embedded secure element is an embedded Subscriber Identity Module.

9. The device of claim 6, wherein the NFC controller is integrated in a System-on-Chip or an Integrated Circuit.

10. The device of claim 6, wherein the NFC controller is configured to provide the first data to the secure element via a single wire protocol interface.

11. A device, comprising:
    an NFC controller, comprising:
       a transceiver circuit configured to wirelessly receive first data from a device; wherein the NFC controller is further configured to communicate with an application processor circuit via a secure element, and to directly and exclusively send the sensitive data the secure element without exposing the sensitive data directly to the application processor circuit;
    the secure element operably coupled to the NFC controller via a first interface;
    the application processor circuit operably coupled to the secure element via a second interface; and
    an antenna coupled to the NFC controller.

12. The device of claim 11, wherein the NFC controller further comprises:
    one or more elements from a group of elements consisting of:
       an embedded secure element;
       a Universal Integrated Circuit Card; and
       a Subscriber Identity Module.

13. The device of claim 12, wherein the embedded secure element is an embedded Subscriber Identity Module.

14. The device of claim 11, wherein the NFC controller is integrated in a System-on-Chip or an Integrated Circuit.

15. The device of claim 11, wherein the NFC controller is configured to send the sensitive data to the secure element via a single wire protocol interface.

* * * * *